United States Patent
Erickson

(10) Patent No.: US 6,755,703 B1
(45) Date of Patent: Jun. 29, 2004

(54) HYDRAULICALLY ASSISTED GEAR SHIFT MECHANISM FOR A MARINE PROPULSION DEVICE

(75) Inventor: James E. Erickson, Charleston, SC (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/336,453
(22) Filed: Jan. 3, 2003
(51) Int. Cl.[7] .............................................. B63H 20/14
(52) U.S. Cl. ........................................ 440/75; 440/616
(58) Field of Search .............................. 440/61 R, 6 H, 440/75, 84

(56) References Cited

U.S. PATENT DOCUMENTS

| | | | |
|---|---|---|---|
| 3,951,009 A | * | 4/1976 | Audifferd et al. .......... 74/15.63 |
| 4,149,428 A | | 4/1979 | Mueller ........................ 74/364 |
| 4,580,457 A | | 4/1986 | Ishida et al. .................. 74/335 |
| 4,788,821 A | | 12/1988 | Mienko et al. ................ 60/585 |
| 5,307,727 A | | 5/1994 | Berger et al. .................. 91/29 |
| 5,328,396 A | | 7/1994 | Hayasaka ..................... 440/86 |
| 5,340,341 A | | 8/1994 | Yoshimura ................... 440/61 |
| 5,667,052 A | | 9/1997 | Richardson .................. 192/85 |
| 6,202,812 B1 | | 3/2001 | Semke ......................... 192/48 |
| 6,338,286 B1 | | 1/2002 | Skogward et al. ............ 74/473 |
| 6,346,017 B1 | | 2/2002 | Silorey et al. ................ 440/75 |

* cited by examiner

Primary Examiner—Jesus D. Sotelo
(74) Attorney, Agent, or Firm—William D. Lanyi

(57) ABSTRACT

A hydraulic assist mechanism for use in conjunction with a gear shift device provides a hydraulic cylinder and piston combination connected by a linkage to a gear shift mechanism. Hydraulic pressure can be provided by a pump used in association with either a power trim system or a power steering system. Hydraulic valves are used to pressurize selected regions of the hydraulic cylinder in order to actuate a piston which is connected, by an actuator, to the gear shift mechanism.

20 Claims, 3 Drawing Sheets

HYDRAULICALLY ASSISTED GEAR SHIFT MECHANISM FOR A MARINE PROPULSION DEVICE

BACKGROUND OF THE INVENTION

1. Field of the Invention

The present invention is generally related to a gear shift assist mechanism for a sterndrive or an outboard motor and, more particularly, to the use of a hydraulic cylinder and piston arrangement that utilizes hydraulic pressure that is made available for another purpose, such as a power assisted trim or steering system, to provide a force which urges the gear selector of the sterndrive or outboard motor into forward or reverse gear in response to electrical signals associated with the manual movement of a gear selector.

2. Description of the Prior Art

Many different types of hydraulically assisted mechanisms are well known to those skilled in the art. Some of these hydraulically assisted mechanisms are used in conjunction with marine propulsion systems and marine vessels.

U.S. Pat. No. 5,340,341, which issued to Yoshimura on Aug. 23, 1994, describes a power assisted mechanism for a marine propulsion unit. The marine propulsion unit steering and gear shift system comprises a single source of hydraulic power, a steered device, a gear shift member, steering and gear shift control mechanism connected to their respective members and first and second power assist devices connected to the gear shift and steering control mechanism for power assist. A single substantially constant output hydraulic pump supplies an essentially constant level of fluid power for the first and second power assist devices to assist the operator in controlling the steering and gear shift controls.

U.S. Pat. No. 6,346,017, which issued to Silorey et al on Feb. 12, 2002, describes a gear shift mechanism for a marine outboard motor drive unit. The mechanism includes a reversible DC electric motor, a sliding clevis, and a shift rod for actuating a gearset within a gearcase between forward, reverse, and neutral positions. The mechanism is housed in a watertight gear shift cover that is attached to a trunion that, in turn, attaches to a top surface of the gearcase. Electronic, logic driven controls reverse the polarity of the motor to manipulate the shift rod via the sliding clevis to shift the gearcase into a selected operating position.

U.S. Pat. No. 5,328,396, which issued to Hayasaka on Jul. 12, 1994, describes a power transmission system for an inboard/outboard motor. A marine outboard motor having an outboard drive unit that includes a bevel gear forward, reverse transmission having hydraulically operated clutches is described. A hydraulic pump for actuating the clutches and for lubricating the transmission is driven off the rear end of the input shaft and control valve means selectively communicates the fluid from the hydraulic pump with the hydraulic clutches. The valve means is a rotary plug type valve but is constructed so as to minimize axial and radial forces acting that would tend to bind its movement. The construction of the outboard drive unit is such that the bevel gear transmission and hydraulically operated clutches can conveniently be inserted through like diameter oppositely facing openings formed in the upper end of the housing assembly of the outboard drive unit.

U.S. Pat. No. 6,338,286, which issued to Skogward et al on Jan. 15, 2002, describes a control device. The apparatus for controlling the gears of a motor vehicle comprises a pivotal gear lever for pivoting between gear positions corresponding to the gear positions for the motor vehicle transmission, a primary hydraulic piston/cylinder arrangement coupled to the gear lever, a secondary hydraulic piston/cylinder arrangement coupled to the gear box of the motor vehicle, and a hydraulic circuit hydraulically communicating with the primary and secondary hydraulic piston and cylinder arrangements and including a flow limiter valve with an open position in which the hydraulic flow of the hydraulic circuit is not limited and a plurality of closed positions for controllably limiting the hydraulic flow in the hydraulic circuit whereby movement between the various gear positions for the motor vehicle is controlled.

U.S. Pat. No. 6,202,812, which issued to Semke on Mar. 20, 2001, describes a simplified transfer case shift actuator. The actuator utilizes standard hydraulic components to achieve high neutral and low positions. A floating piston is movable within a cylinder, and abuts a spacer after a predetermined amount of movement. Once the floating piston abuts the spacer, further movement of the rod is prevented. This defines the neutral position. The use of the spacer and the floating piston provides a simplified arrangement for achieving the neutral position when compared to the prior art.

U.S. Pat. No. 5,667,052, which issued to Richardson on Sep. 16, 1997, describes a hydraulic control system for a synchronizer. The system for displaying a synchronizer into engagement with a rotating gear in a gearbox includes a hydraulic piston/cylinder unit mechanically coupled to the synchronizer, an electrically controllable pressure regulating valve for supplying hydraulic fluid to the piston/cylinder unit and an electrical control circuit acting on the pressure regulating valve to vary the pressure of the hydraulic fluid supplied to the piston/cylinder unit. In order to effect a rapid and smooth engagement of the synchronizer, the control circuit acts to increase the pressure of the hydraulic fluid supplied to the piston/cylinder unit progressively.

U.S. Pat. No. 5,307,727, which issued to Berger et al on May 3, 1994, describes a neutral to drive shift time control. In a neutral to drive shift timing control mechanism, a flow control arrangement is utilized in an electro-hydraulic control system for controlling a clutch fill period of a neutral to drive shift sequence. The hydraulic control system provides a pressure pulse of predetermined time which opens a valve to permit fluid flow to bypass an accumulator feed orifice to pressurize the clutch apply cylinder and piston to a value substantially equal to the piston return spring force without providing excess flow to the accumulator. The clutch apply pressure is then permitted to increase at a more normal rate which is controlled by the accumulator. The engagement time is determined so that the pulse time can be adjusted if the neutral to drive shift is not within a predetermined time range.

U.S. Pat. No. 4,788,821, which issued to Mienko et al on Dec. 6, 1988, describes a hydraulic shift for a motor vehicle transmission. A hydraulic apparatus for remotely controlling the operative mode selector of a motor vehicle automatic transmission is described. The apparatus comprises a master cylinder having an input member operatively connected to the transmission operative mode selection or shift lever placed at the disposal of the motor vehicle operator, and a slave cylinder mounted on or proximate the transmission casing and having an output member connected to the transmission operative mode selector, the master cylinder and the slave cylinder being placed in fluid communication through flexible conduits such that each displacement of the master cylinder piston as a result of displacement of the master cylinder input member causes a corresponding displacement of the slave cylinder piston coupled to the slave cylinder output member. The master cylinder is provided with a built-in reservoir of hydraulic fluid connected to the working chambers, one on each side of the master cylinder piston, by valved passageways permitting flow of fluid from the reservoir to the low pressure chamber and closing the high pressure chamber from the reservoir so as to compensate for slow changes in hydraulic fluid volume due to expansion and contraction. The master cylinder and the slave cylinder are pivotably and adjustably mounted to a stationary support bracket by a ball and socket arrangement having an eccentric mounting aperture.

U.S. Pat. No. 4,580,457, which issued to Ishida et al on Apr. 8, 1986, describes a manual or hydraulic gear shifting apparatus. A vehicle transmission control apparatus includes a plurality of shift members for operating a vehicle transmission; a lever adapted for movement in one sense into a plurality of positions, one end of the lever being operatively coupled to a different one of the shift members in each of the positions; the lever being further adapted for pivotal movement in response to which the one end of the lever actuates the operatively coupled shift member; a select actuator comprising a select cylinder and a select piston retained thereby, the select piston being coupled to the lever and hydraulically controlled to produce the movement thereof in the one sense; a shift actuator comprising a hydraulic cylinder and a shift piston retained thereby, the shift piston being coupled to the lever and hydraulically controlled to produce the pivotal movement thereof and a control member coupled to the lever and manually operable to produce therefore both the pivotal movement and the movement in the one sense.

U.S. Pat. No. 4,149,428, which issued to Mueller on Apr. 17, 1979, describes a hydraulic shift mechanism for transfer case with multiple path drive system. The apparatus for a transfer case that has a multiple path drive system is disclosed. It includes a neutral position, a first drive path of one speed range and a second drive path of a different speed range, the apparatus including a hydraulic cylinder assembly having piston means movable to three positions and a rod connected to the piston means and to a shift mechanism of the transfer case for moving the shift mechanism of the transfer case selectively to one of the three positions of the drive system, and a hydraulic control valve means for selectively controlling from a remote location operation of the hydraulic cylinder assembly The patents described above are hereby expressly incorporated by reference in the description of the present invention.

SUMMARY OF THE INVENTION

A gear shift assist mechanism for a marine propulsion device, made in accordance with the preferred embodiment of the present invention, comprises a gear shift mechanism which is alternately movable into forward, neutral, and reverse positions. It also comprises a manually operable gear position selector, a hydraulic pump, a hydraulic cylinder connected in fluid communication with the hydraulic pump, and a hydraulic piston disposed within the hydraulic cylinder. An actuator is connected to the piston and also connected to the gear shift mechanism. Movement of the piston relative to the cylinder causes the gear shift mechanism to move between selected ones of the forward, neutral, and reverse positions. A switching device is connected in fluid communication with the cylinder for conducting hydraulic pressure from the hydraulic pump into a selected region of the hydraulic cylinder in response to a signal received from the manually operable gear position selector.

In a particularly preferred embodiment of the present invention, the piston is movable to a first end of the cylinder to cause the gear shift mechanism to move into forward position when the selected region is a first region of the hydraulic cylinder and the piston is movable to a second end of the cylinder to cause the gear shift mechanism to move into the first position when the selected region is a second region of the hydraulic cylinder. The piston is movable to a central position of the cylinder to cause the gear shift mechanism to move into the neutral position when the hydraulic pressure is blocked from fluid communication with both the first and second regions. A return path to the reservoir is provided. A position biasing component, such as a pair of springs, is disposed within the cylinder to urge the piston toward a position within the cylinder which corresponds to the neutral position of the gear shift mechanism.

A pressure accumulator can be connected in fluid communication between the hydraulic pump and the switching device to provide the desired pressure and flow under all operating conditions. The gear shift mechanism can comprise a shift shaft. The hydraulic pump can be connected in fluid communication with a power steering mechanism or a power trim system of the marine propulsion system. The switching device is connected in signal communication with the manually operable gear position selector.

A preferred embodiment of the present invention can further comprise an electrical switch associated with the manually operable gear position selector and responsive to the position of the manually operable gear position selector. The electrical switch can provide the signal communication between the switching device and the manually operable gear position selector.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
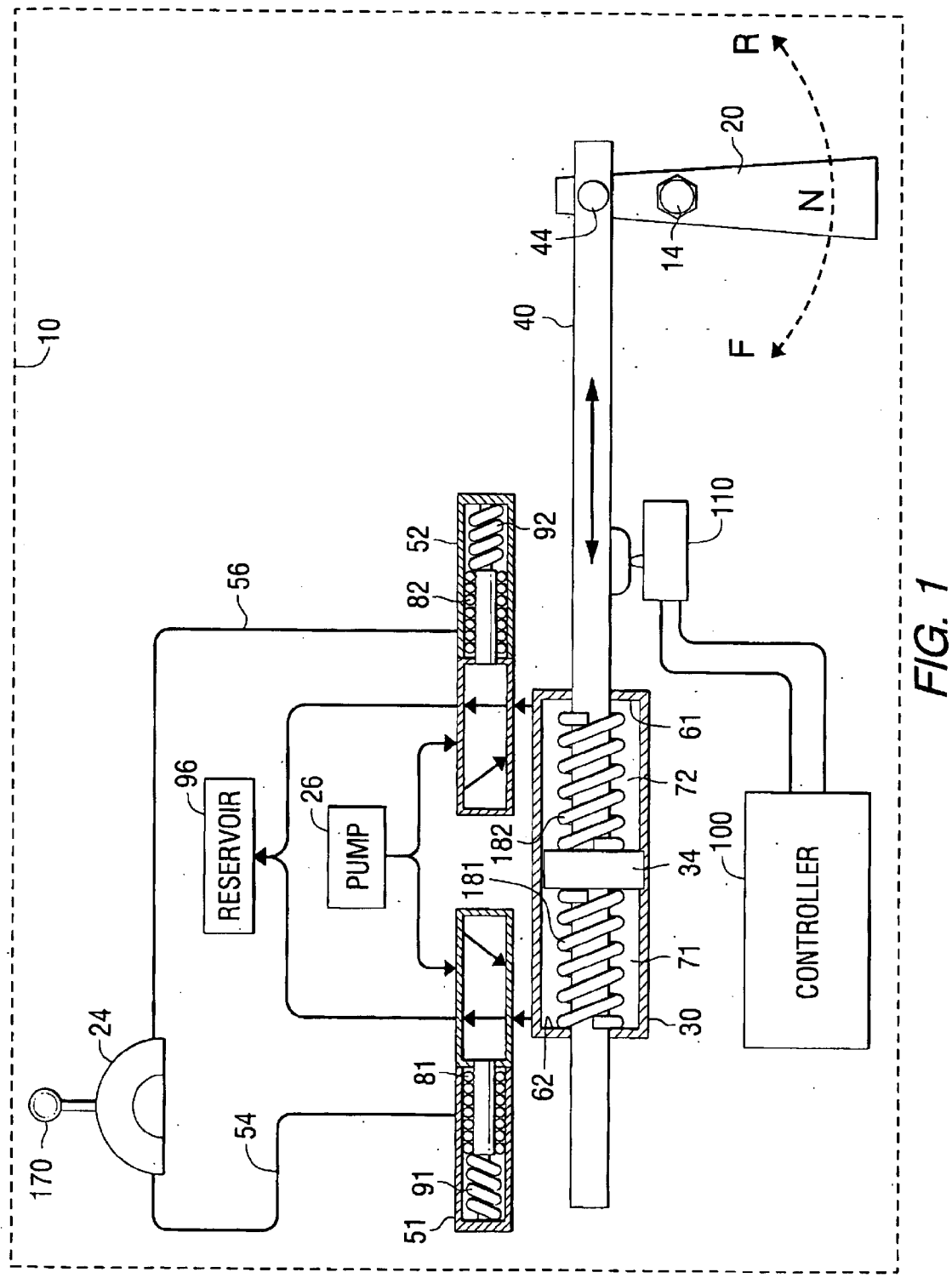
FIG. 1 is a schematic representation of a gear shift mechanism incorporating the present invention.

Throughout the description of the preferred embodiment of the present invention, like components will be identified by like reference numerals.

In FIG. 1, dashed box 10 represents a marine vessel, including the marine propulsion system that powers the vessel. A gear shift mechanism 14 is alternately movable between forward F, reverse R, and neutral N gear positions. In the example shown in FIG. 1, the gear shift mechanism 14 is represented as a shift shaft about which the lever 20 rotates. The dashed line arrow represents the arc through which the lever 20 rotates to place the shift shaft 14 in the forward F, neutral N, and reverse R gear positions.

The present invention comprises a manually operable gear position selector 24, a hydraulic pump 26, a hydraulic cylinder 30, and a hydraulic piston 34 that is disposed within the hydraulic cylinder 30. The hydraulic cylinder 30 is connected in fluid communication with the hydraulic pump 26, as shown in FIG. 1, by a switching device that comprises two solenoid operated hydraulic valves which will be described in greater detail below. An actuator 40 is connected to the piston 34 and also to the gear shift mechanism 14 through its connection, at pin 44, to the lever 20.

The switching device, which comprises hydraulic valves 51 and 52, is connected in fluid communication with the cylinder 30 for conducting hydraulic pressure from the hydraulic pump 26 into a selected region of the hydraulic cylinder in response to a signal, received on lines 54 and 56, from the manually operable gear position selector 24. The piston 34 is movable to a first end 61 of the cylinder 30 to cause the gear shift mechanism 14 to move into the forward position when the selected region of the cylinder 30 is a first region 71. The piston 34 is movable to a second end 62 of the cylinder 30 to cause the gear shift mechanism 14 to move into the reverse position when the selected region is a second region 72 of the hydraulic cylinder 30.

With continued reference to FIG. 1, if the first solenoid 81 of the first hydraulic valve 51 is actuated to operate against the force of spring 91, the pump 26 will be disposed in fluid communication with the first region 71 of the cylinder 30. With the second hydraulic valve 52 remaining in the position shown in FIG. 1, the piston 34 will be urged toward the first end 61 of the cylinder 30 and the actuator 40 will cause the lever 20 to rotate in a clockwise direction into the forward F position. Similarly, if the second solenoid 82 is activated against the resistive force of the second spring 92, the second hydraulic valve 52 will be moved into a position that places the hydraulic pump 26 in direct fluid communication with the second region 72 of the cylinder 30. This causes the piston 34 to move toward the second end 62 of the cylinder. As a result, the actuator 40 causes the lever 20 to rotate in a counterclockwise direction toward the reverse R position. It should be understood that when of the two hydraulic valves, 51 or 52, is actuated to connect the pump 26 in fluid communication with the first or second regions, 71 or 72, of the cylinder 30, the other hydraulic valve is placed in a position that allows hydraulic fluid to escape from the other of the two regions of the cylinder 30 back to the reservoir 96. It should also be noted that both of the hydraulic valves, 51 and 52, are provided with springs, 91 and 92, respectively, which urge their respective valves into the position which allows hydraulic pressure to escape from the associated region of the hydraulic cylinder 30. When one of the two hydraulic valves, 51 or 52, is activated to connect the pump 26 in fluid communication with one of the regions of the cylinder 30, the other hydraulic valve is placed in the position to allow hydraulic fluid to escape from the other region of the cylinder as the piston 34 moves into and through that region.

With continued reference to FIG. 1, a controller 100 is provided with signals relating to the position of the actuator 40. A neutral start safety switch 110 provides a signal to the controller 100 when the actuator 40 is in the position to place the gear shift mechanism 14 in a neutral gear position. The signal received from switch 110 is used by the controller 100 to allow the operator of the marine vessel to start the engine only when the actuator 40 is in a position that places the gear shift mechanism 14 in a neutral position.

Figure 2:
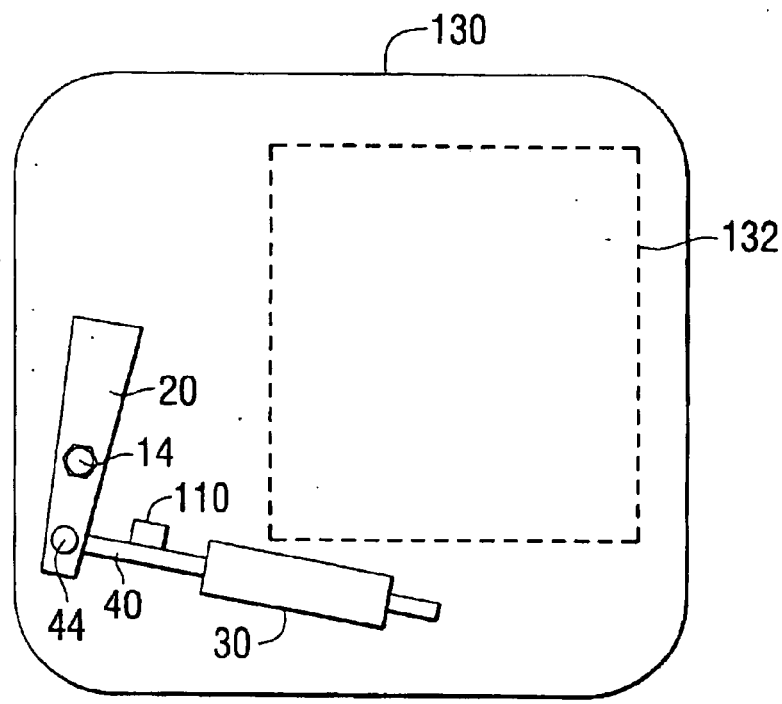
FIG. 2 shows a marine propulsion drive unit incorporating the present invention.

FIG. 2 shows the gear shift assist mechanism of the present invention disposed within a marine propulsion device 130. If the marine propulsion device is a sterndrive system, the present invention can be disposed within the housing of the drive component. If the marine propulsion device 130, on the other hand, is an outboard motor, the present invention can be disposed under the cowl and adjacent to an internal combustion engine 132. It should be understood that the particular type of marine propulsion system used to propel the marine vessel is not limiting to the present invention. As long as the actuator 40 is attached to a component, such as lever 20, which allows the force of the piston 34 to be imposed to change the position of the gear shift mechanism 14, the present invention can be used as a gear shift assist mechanism in the manner described above. Within the scope of the present invention, a cable can also be used to perform this function.

Figure 3:
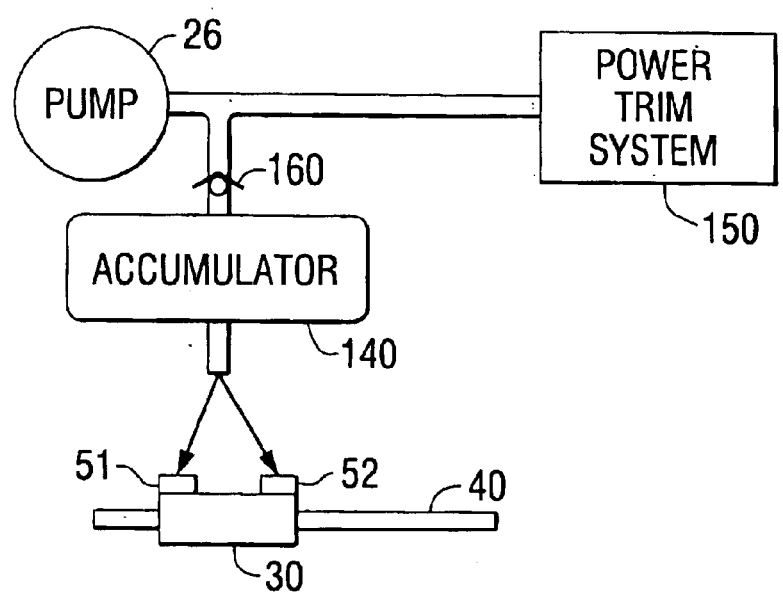
FIG. 3 shows the present invention used in conjunction with an accumulator and a pump of a power trim or power steering system.

FIG. 3 shows the present invention used in conjunction with an accumulator 140 that is connected in fluid communication between the hydraulic pump 26 and the cylinder 30 of the present invention. FIG. 3 represents a marine vessel that is equipped with either a power trim system 150 or a power steering system which would be connected similarly to the power trim system 150 illustrated in FIG. 3. The accumulator 140 accumulates pressurized hydraulic fluid whenever the pump 26 is operated. A check valve 160 maintains the pressure in the accumulator 140 until one of the hydraulic valves, 51 or 52, is activated to move the actuator 40. The accumulator 140 allows the present invention to operate even when the pump 26 is not currently in operation. It should be understood, for purposes of understanding the applicability of the present invention, a power steering system could replace the power trim system 150 in FIG. 3.

Figure 4:
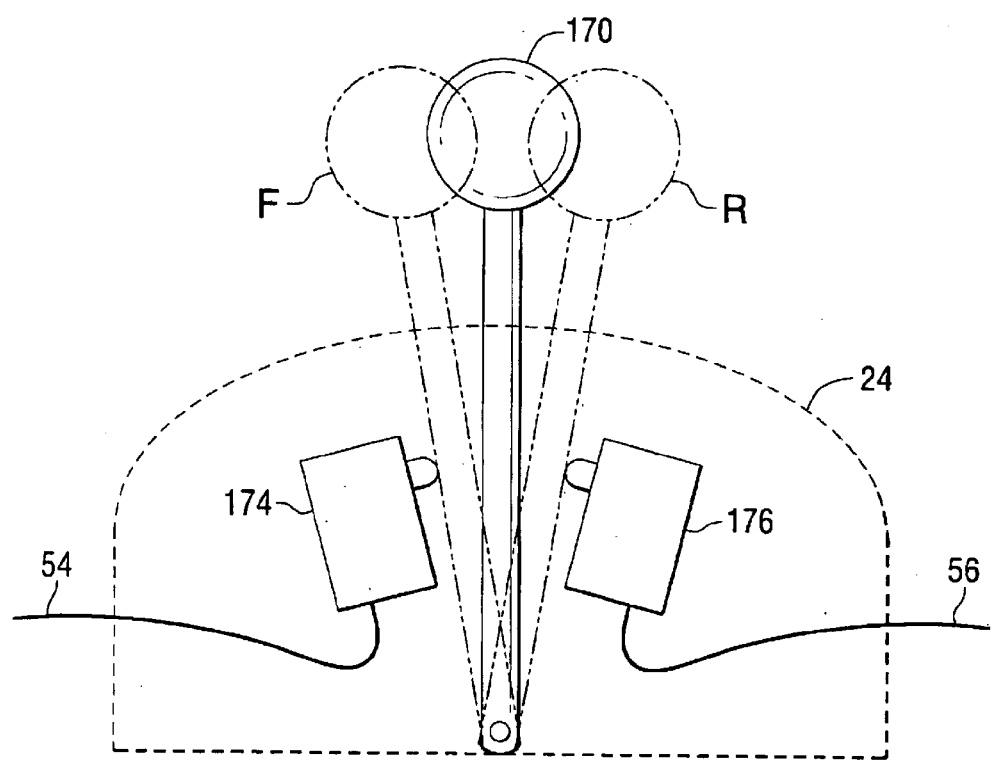
FIG. 4 is a simplified schematic representation of a manually operable gear position selector and a pair of switches used in conjunction with the present invention.

FIG. 4 is a schematic representation of the manually operable gear position selector 24. The handle 170 is movable to at least a neutral position, shown by solid lines in FIG. 4, and forward F and reverse R positions, shown by dashed lines in FIG. 4. In a most basic application of the present invention, a forward sensing switch 174 and a reverse sensing switch 176 are provided to detect the movement of the handle 170 into those positions. Signals are provided on lines 54 and 56 to the two hydraulic valves, 51 and 52, of the switching device.

With reference to FIGS. 1–4, and particularly to FIG. 1, it should be noted that a position biasing component is provided to urge the piston 34 to a central position within the cylinder 30 when hydraulic pressure from the pump 26 or the accumulator 140 is not being directed into either the first or second, 71 or 72, regions of the cylinder 30. The position biasing component can comprise two springs, 181 and 182, which are disposed within the cylinder 30 to provide a centering force against the piston 34 which urges the actuator 40 into a neutral position N when both of the hydraulic valves, 51 and 52, are in the positions shown in FIG. 1. In other words, when the operator of the marine vessel is not requesting either a forward or reverse position, by movement of the handle 170, the actuator 40 is automatically urged toward the central position by the pair of springs 181 and 182.

In marine propulsion systems for a marine vessel that comprises either a power trim system 150 or a power steering system, a hydraulic pump is necessary. In those types of marine vessels, it is very easy to provide the benefits of the present invention with few additional components. A cylinder 30 and piston 34 can easily be connected directly to a gear shift mechanism, such as the shift shaft 14. This can be accomplished directly or through a lever structure 20. Two hydraulic valves, 51 and 52, can be connected in signal communication with the manually operable gear position selector 24 to direct pressurized hydraulic fluid from a pump 26 to either the first or second regions, 71 or 72, of the cylinder 30. The cylinder can be disposed within the drive unit of either a sterndrive system or an outboard motor. The actuator 40 can be combined with the lever 20 or alternately connected to the gear shift mechanism. The cylinder 30 and piston 34 are designed to provide the required shift stroke of a gear shift mechanism. The actuator 40, which is connected to the piston 34, can be connected directly to the shift linkage in the drive unit, or remotely connected via an intermediate shift cable. The piston 34 is spring loaded to center position which is the neutral position of the actuator 40. A dual circuit solenoid valve, which can comprise two hydraulic valves, 51 and 52, is used to provide hydraulic pressure to the cylinder 30 for forward and reverse actuation. These solenoid valves are typically designed so that when one circuit, or hydraulic valve, is open, the other hydraulic valve is closed. Although FIG. 1 shows the hydraulic valves, 51 and 52, as being independent from each other, one skilled in the art should understand that a combined pair of hydraulic valves can easily be provided to assure that only one of the two hydraulic valves connects the pump 26 in fluid communication with the cylinder 30 at any time. An accumulator 140 is incorporated into the circuit on applications with the power trim pump 26, or power steering pump, in order to allow the present invention to operate effectively even when the pump 26 is not operating or operating at a speed or under a condition that may not produce sufficient pressure for a period of time. The solenoid valve, such as hydraulic valves 51 or 52, which is not activated to pressurize its associated side of the cylinder 30 is configured to allow high pressure to return to the reservoir 96. For neutral position, both solenoids, 81 and 82 are deactivated and the springs, 181 and 182, cause the piston 34 to return to its central or neutral position. The springs, 181 and 182, are sized to provide the required shift force on the actuator 40 that is needed to disengage the clutch under any given circumstance. The neutral start safety switch 110 is employed in the system to assure that the actuator is fully in the neutral position before the engine can be started. The spring loaded return to neutral design of the present invention also provides a fail safe mode in the event that power for the system is lost. This design avoids the need of expensive logic circuits that are required in some alternative systems. A mechanical device, not illustrated in the figures, can easily be employed for shifting the unit into gear when the hydraulic system experiences a failure in order to allow the marine vessel to return home in the event of such a hydraulic failure. If the hydraulic pump 26 fails, but the remaining portions of the hydraulic system remain in an operable condition, pressure stored in the accumulator will allow the operator of the marine vessel to shift into forward or reverse.

Although the present invention has been described with particular specificity and illustrated to show a preferred embodiment, it should be understood that alternative embodiments are also within its scope.

I claim:

1. A gear shift assist mechanism for a marine propulsion device, comprising:
    a gear shift mechanism being alternately movable into forward, neutral, and reverse positions;
    a manually operable gear position selector;
    a hydraulic pump;
    a hydraulic cylinder connected in fluid communication with said hydraulic pump;
    a hydraulic piston disposed within said hydraulic cylinder;
    an actuator connected to said piston, said actuator being connected to said gear shift mechanism, whereby movement of said piston relative to said cylinder causes said gear shift mechanism to move between selected ones of said forward, neutral, and reverse positions; and
    a switching device connected in fluid communication with said cylinder for conducting hydraulic pressure from said hydraulic pump into a selected region of said hydraulic cylinder in response to a signal received from said manually operable gear position selector.

2. The mechanism of claim 1, wherein:
    said piston is movable to a first end of said cylinder to cause said gear shift mechanism to move into said forward position when said selected region is a first region of said hydraulic cylinder.

3. The mechanism of claim 2, wherein:
    said piston is movable to a second end of said cylinder to cause said gear shift mechanism to move into said reverse position when said selected region is a second region of said hydraulic cylinder.

4. The mechanism of claim 3, wherein:
    said piston is movable to a central position of said cylinder to cause said gear shift mechanism to move into said neutral position when said hydraulic pressure is blocked from fluid communication with both of said first and second regions.

5. The mechanism of claim 1, further comprising:
    a position biasing component disposed within said cylinder to urge said piston toward a position within said cylinder which corresponds to said neutral position of said gear shift mechanism.

6. The mechanism of claim 5, wherein:
    said position biasing component comprises a pair of springs disposed within said hydraulic cylinder.

7. The mechanism of claim 1, further comprising:
    a pressure accumulator connected in fluid communication between said hydraulic pump and said switching device.

8. The mechanism of claim 1, wherein:
    said gear shift mechanism comprises a shift shaft.

9. The mechanism of claim 1, wherein:
    said hydraulic pump is connected in fluid communication with a power steering mechanism of said marine propulsion system.

10. The mechanism of claim 1, wherein:
    said hydraulic pump is connected in fluid communication with a power trim system of said marine propulsion system.

11. The mechanism of claim 1, wherein:
    said switching device is connected in signal communication with said manually operable gear position selector.

12. The mechanism of claim 10, further comprising:
    an electrical switch associated with said manually operable gear position selector and responsive to the position of said manually operable gear position selector, said electrical switch providing said signal communication between said switching device and said manually operable gear position selector.

13. A gear shift assist mechanism for a marine propulsion device, comprising:
    a gear shift mechanism being alternately movable into forward, neutral, and reverse positions;
    a manually operable gear position selector;
    a hydraulic pump;

a hydraulic cylinder connected in fluid communication with said hydraulic pump;

a hydraulic piston disposed within said hydraulic cylinder;

an actuator connected to said piston, said actuator being connected to said gear shift mechanism, whereby movement of said piston relative to said cylinder causes said gear shift mechanism to move between selected ones of said forward, neutral, and reverse positions;

a switching device connected in fluid communication with said cylinder for conducting hydraulic pressure from said hydraulic pump into a selected region of said hydraulic cylinder in response to a signal received from said manually operable gear position selector, said piston being movable to a first end of said cylinder to cause said gear shift mechanism to move into said forward position when said selected region is a first region of said hydraulic cylinder, said piston being movable to a second end of said cylinder to cause said gear shift mechanism to move into said reverse position when said selected region is a second region of said hydraulic cylinder, and said piston being movable to a central position of said cylinder to cause said gear shift mechanism to move into said neutral position when said hydraulic pressure is blocked from fluid communication with both of said first and second regions; and a position biasing component disposed within said cylinder to urge said piston toward a position within said cylinder which corresponds to said neutral position of said gear shift mechanism.

14. The mechanism of claim 13, wherein:

said position biasing component comprises a pair of springs disposed within said hydraulic cylinder.

15. The mechanism of claim 14, further comprising:

a pressure accumulator connected in fluid communication between said hydraulic pump and said switching device.

16. The mechanism of claim 15, wherein:

said switching device is connected in signal communication with said manually operable gear position selector.

17. The mechanism of claim 16, further comprising:

an electrical switch associated with said manually operable gear position selector and responsive to the position of said manually operable gear position selector, said electrical switch providing said signal communication between said switching device and said manually operable gear position selector.

18. A gear shift assist mechanism for a marine propulsion device, comprising:

a gear shift mechanism being alternately movable into forward, neutral, and reverse positions;

a manually operable gear position selector;

a hydraulic pump;

a hydraulic cylinder connected in fluid communication with said hydraulic pump;

a hydraulic piston disposed within said hydraulic cylinder;

an actuator connected to said piston, said actuator being connected to said gear shift mechanism, whereby movement of said piston relative to said cylinder causes said gear shift mechanism to move between selected ones of said forward, neutral, and reverse positions;

a switching device connected in fluid communication with said cylinder for conducting hydraulic pressure from said hydraulic pump into a selected region of said hydraulic cylinder in response to a signal received from said manually operable gear position selector, said piston being movable to a first end of said cylinder to cause said gear shift mechanism to move into said forward position when said selected region is a first region of said hydraulic cylinder, said piston being movable to a second end of said cylinder to cause said gear shift mechanism to move into said reverse position when said selected region is a second region of said hydraulic cylinder, and said piston being movable to a central position of said cylinder to cause said gear shift mechanism to move into said neutral position when said hydraulic pressure is blocked from fluid communication with both of said first and second regions, said switching device being connected in signal communication with said manually operable gear position selector; and a position biasing component disposed within said cylinder to urge said piston toward a position within said cylinder which corresponds to said neutral position of said gear shift mechanism.

19. The mechanism of claim 18, wherein:

said position biasing component comprises a pair of springs disposed within said hydraulic cylinder.

20. The mechanism of claim 19, further comprising:

a pressure accumulator connected in fluid communication between said hydraulic pump and said switching device; and an electrical switch associated with said manually operable gear position selector and responsive to the position of said manually operable gear position selector, said electrical switch providing said signal communication between said switching device and said manually operable gear position selector.

\* \* \* \* \*